United States Patent [19]
Lersch et al.

[11] Patent Number: 5,606,077
[45] Date of Patent: Feb. 25, 1997

[54] METHOD FOR THE SYNTHESIS OF ORGANOPOLYSILOXANES CONTAINING CARBONATE GROUPS

[75] Inventors: Peter Lersch, Oberhausen; Christian Weitemeyer, Essen, both of Germany

[73] Assignee: Th. Goldschmidt AG, Essen, Germany

[21] Appl. No.: 604,541

[22] Filed: Feb. 21, 1996

[30] Foreign Application Priority Data

Feb. 21, 1995 [DE] Germany .................. 195 05 892.5

[51] Int. Cl.$^6$ .................. C07F 7/08; C07D 317/10
[52] U.S. Cl. .................................................. 549/214
[58] Field of Search .............................. 549/214

[56] References Cited

U.S. PATENT DOCUMENTS

| | | |
|---|---|---|
| 3,189,662 | 6/1965 | Vaughn, Jr. et al. . |
| 3,821,325 | 6/1974 | Merritt, Jr. et al. . |
| 4,657,989 | 4/1987 | Evans . |
| 5,449,736 | 9/1995 | Cabasso et al. .......... 549/214 X |
| 5,550,241 | 8/1996 | Brois .......... 549/214 X |

OTHER PUBLICATIONS

Dorigo, R.; Teyssié, D.; Yu, J. M.; and Boileau, S., New Polysiloxanes Obtained by Chemical Modification Using Hydrosilylation: Synthesis and Properties, Collège de France, Laboratoire de Chimie Macromoléculaire associé au CNRS: URA 24, 420–421, 1989.

Zhu, Z.; Yang, C.; Einset, A. G.; Chen W. Wnek, G. E., New Polysiloxanes Bearing Cyclic Carbonate Side Chains: Synthesis and Ionic Conductivity Studies Department of Chemistry and Center for Polymer Synthesis, Rensselaer Polytechnic Institute, Troy, NY 12180–3590, 496–497, 1990.

*Primary Examiner*—Paul F. Shaver
*Attorney, Agent, or Firm*—Anderson Kill & Olick P.C.

[57] ABSTRACT

The invention relates to a method for the synthesis of organopoiysiloxanes of the general formula

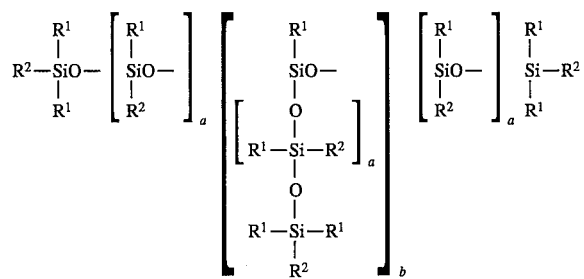

which contains cyclic carbonate groups. The inventive compounds have a high polarity, can be synthesized easily and, because of their compatibility with polar media, find use as additives for dispersion paints or lacquers and for coating the surfaces of pigments and fillers.

6 Claims, No Drawings

METHOD FOR THE SYNTHESIS OF ORGANOPOLYSILOXANES CONTAINING CARBONATE GROUPS

FIELD OF INVENTION

The invention relates to a method for synthesizing organopolysiloxanes, which contain cyclic carbonate groups and are suitable as intermediates for further reactions with compounds having nucleophilic groups.

BACKGROUND INFORMATION AND PRIOR ART

For using polysiloxanes in polar media, it is necessary to incorporate polar groups in the siloxane. For this purpose, numerous possibilities are described in the literature.

The synthesis of siloxane-carbonate block copolymers is known from the patent literature (for example, from U.S. Pat. No. 3,189,662; U.S. Pat. No. 3,821,325 or U.S. Pat. 4,657,989). In the majority of cases, it is a question of polydimethyl-siloxanes, which are terminated with bisphenol A and obtained by the reaction of the reactive end group of polysiloxanes with bisphenols in the present of phosgene or diaryl carbonates. Linkage is accomplished in these reactions predominantly over the hydrolyrically unstable Si—O—C bonds.

Siloxanes with SiC-linked carbonate groups are described by Boileau et al. in Polym. Prepr. (Am. Chem. Soc., Div. Polym. Chem., 1990, 31 (2), pages 420–1). The synthesis is accomplished by a hydrosilylation reaction of SiH siloxanes with allylphenol carbonate. However, according to information from the authors, the reaction is quite complex and does not proceed satisfactorily in the desired reaction, because about 50% of the carbonate functions are decomposed under the reaction conditions, carbon dioxide being split off and SiOC-functionai siloxanes being formed.

In Polym. Prepr. (Am. Chem. Soc., Div. Polym. Chem., 1994, 35 (1), pages 496–7), Zhu et al. described the transesterification of allyl-functionai 1,2 diols, such as 5-hexene-1,2-diol with diethyl carbonate and the subsequent, platinum-catalyzed hydrosilylation reaction of the product with SiH siloxanes in different solvents, such as acetone or acetonitrile. According to the authors, the side reactions are largely but not completely avoided by this step of the method. Furthermore, it is a disadvantage of this method that the reaction is carried out at moderate temperatures (60° C.) and therefore requires quite a long time. Moreover, the addition of solvent not only decreases the volume yield of the method, but also makes it necessary to distill off the solvent in an additional step of the method, which is associated with costs.

It has now been found that organopolysiloxanes, which contain cyclic carbonate groups, can be synthesized easily by a simple method.

OBJECT OF THE INVENTION

An object of the present invention is a method for the synthesis of polysiloxanes containing cyclic carbonate groups.

The inventive polysiloxanes have the general, average formula

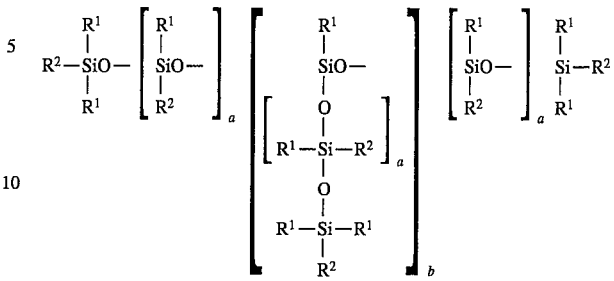

wherein $R^1$ are identical or different groups and represent alkyl groups with 1 to 4 carbon atoms or phenyl groups, at least 90% of the $R^1$ groups being methyl groups, $R^2$ has the same meaning as $R^1$, with the proviso that at least one $R^2$ group is a group of the general formula

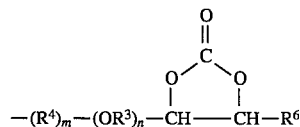

wherein $R^3$ are identical or different alkylene groups with 1 to 4 carbon atoms, $R^4$ is an optionally branched alkylene group with 1 to 20 carbon atoms and $R^6$ is hydrogen or an alkyl group with 1 to 4 carbon atoms or an alkylene group forming a ring with $R^4$ and m has a value of 0 or 1, n has a value of 0 to 20, with the proviso that either m or n is at least 1, a has a value of 0 to 1000, b has a value of 0 to 10, characterized in that compounds of the general, average formula

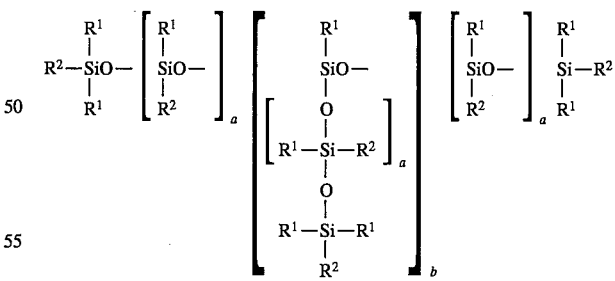

in which $R^5$ can be $R^1$, with the proviso that at least one $R^5$ group is a group of the general formula

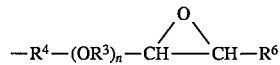

and the remaining groups and subscripts have the meaning given above, are reacted with carbon dioxide.

Examples of the $R^2$ group (in the event that $R^2$ is not identical with $R^1$) accordingly are

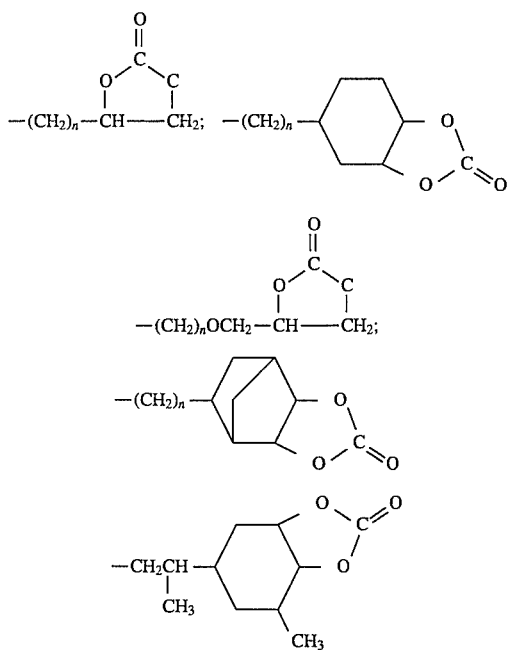

The following are mentioned as examples of the polysiloxanes, which contain carbonate groups, and are synthesized pursuant to the invention.

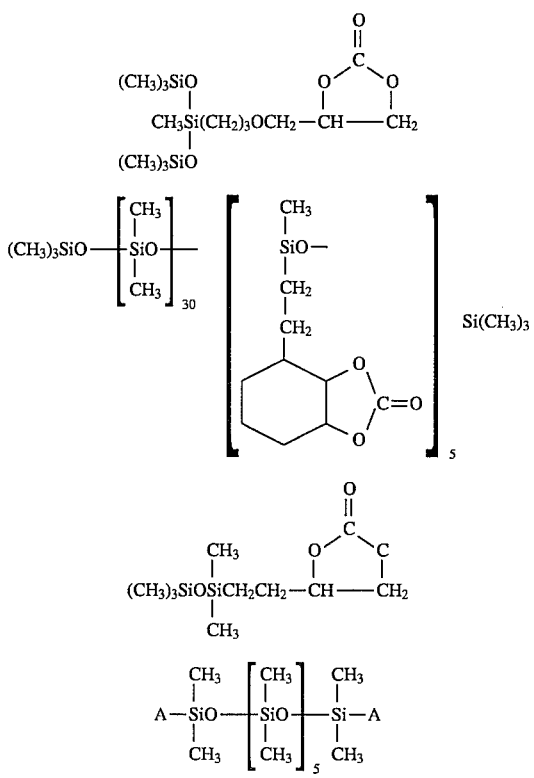

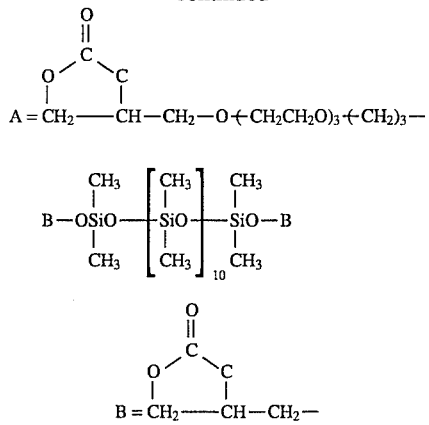

The reaction preferably is carried out catalytically at atmospheric pressure at temperatures of 0° to 180° C. and particularly of 70° to 150° C., in the absence of solvents.

The reaction of oxiran with carbon dioxide to form cyclic carbonates is described in the literature. Of the large number of catalysts described for the reaction (Lewis acids, transition metal complexes, organometallic compounds and phase transfer reagents), the preferred catalysts for the reaction with epoxide-functional siloxanes are the ones that have a high catalytic activity and, at the same time, that fulfill the condition that decomposition reactions of the siloxane backbone are not induced by them. Surprisingly, it has been found that quaternary onium salts or lithium salts fulfill these requirements to a high degree.

Epoxy siloxanes, the epoxy-functional groups of which are linked by SiC bonds to the silicon atoms of the siloxane, are obtained in the usual manner by the addition reaction between siloxanes having SiH groups and epoxyalkenes or epoxyalkene ethers, which have terminal double bonds accessible to hydrosilylation, in the presence of hydrosilylation catalysts. Suitable, commercially available epoxyalkenes or epoxyalkene ethers are, for example, limonene oxide, alkyl glycidyl ether, vinylcyclohexene oxide and 3,4-epoxy-1-butene.

Epoxysiloxanes, the epoxy-functional groups of which are linked over SiO bonds with the silicon atoms of the siloxane, are obtained in the usual manner by the addition reaction between siloxanes, having SiCl groups and hydroxyalkyl-functional epoxides in the presence of bases as hydrogen chloride scavengers. Suitable hydroxyalkyl-functional epoxides are, for example, 2,3-epoxy-1-propanol (glycidol) or 2,3-epoxy-3-phenyl-1-propanol.

The siloxanes, obtained pursuant to the invention, are outstandingly suitable as intermediates for further reaction with compounds with nucleophilic groups, such as alcohols, mercaptans and amines.

The reaction proceeds as follows:

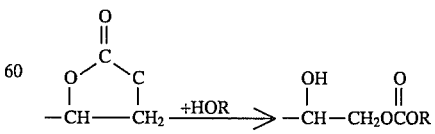

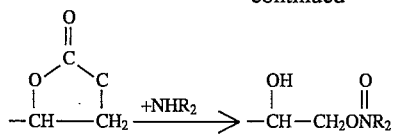

Corresponding dimeric products can be synthesized by using primary amines.

The inventive siloxanes with cyclic carbonate groups are of great interest, since they exhibit good compatibility with different polymers (PVC) and, due to their high polarities and high refractive indexes, can also be used as new polymeric materials for optical and electronic applications.

Carbonate-functional siloxanes can likewise be used as compatibilizers in mixtures of synthetic resins, in order to change their mechanical properties. Moreover, such products can also be polymerized cationically or anionically or copolymerized with epoxides or lactones. Furthermore, they also have an additional synthesis potential, since a broad range of synthetic chemistry can be built up on the basis of such carbona-tefunctional siloxanes.

For example, by reaction with aliphatic amines, carbamate-functional siloxanes become accessible, which can be reacted further to form isocyanate-containing siloxanes. However, other nucleophilic compounds are, in principle, also suitable for forming derivatives.

The functionality of the siloxane copolymers, that is, the ratio of carbonate groups to siloxane groups in the organopolysiloxane, which is to be used pursuant to the invention, is of considerable importance. As the content of carbonate groups increases in the organopolysiloxane, which is to be used pursuant to the invention, the polar character of the material and the solubility in polar solvents also increase. Examples of polar solvents are water, as well as water-soluble organic solvents, such as methanol, ethanol, acetone, dioxane, dimethylformamide, tetrahydrofuran, dimethyl sulfoxide and their mixtures.

The alkylene substituents, which act as linking element between the siloxane backbone and the carbonate groups, can also affect the polar behavior. As the chain length of the alkylene groups increases, the nonpolar character is also increased. On the other hand, the introduction of polyether groups additionally increases the solubility in polar systems.

By these means, it becomes clear to those skilled in the art that the organopolysiloxanes, which are to be used pursuant to the invention, over numerous possibilities for matching the polarity to the chemical character of the solvent used, for example, up to water solubility, and are therefore especially suitable for being adapted to the particular application.

For example, they find use as additives for dispersion paints or lacquers or for coating the surfaces of pigments and fillers.

The following Examples are provided by way of illustration only and not by way of limitation.

EXAMPLES OF THE SYNTHESIS AND USE

Example 1

A polydimethyl siloxane of the general formula $MD_{36}D^H_{12}M$ (Formula 1, 356.0 g, 0.1 mole), which has lateral SiH groups and an average chain length N=50, is added together with 100 mL of toluene and 4 mg (=20 ppm Pt) of hexachloroplatinic acid $H_2PtCl_6$ to an 800 mL 4-neck Bask, which is equipped with a stirrer, dropping funnel, thermometer and redux condenser and heated with stirring to 110° C. At this temperature, 136.8 g (1.2 moles) of allyl glycidyl ether are added dropwise at such a rate that, despite the exothermic reaction that sets in, a temperature of 130° is not exceeded. At the end of the addition, the reaction mixture is stirred for a further 1 to 2 hours at 110° C., until a check of the conversion by way of the SiH value shows that the allyl glycidyl ether has been added completely in a hydrosilylation reaction. At a conversion of >99%, the reaction is terminated and the platinum residues removed from the reaction mixture by filtration. Excess allyl glycidyl ether as well as solvents and volatile by-products are removed by distillation under the vacuum of an oil pipe.

The epoxysiloxane (Formula 2, 49.1 g, 0.01 mole), so produced, and 50 mL of toluene are added to a 250 mL 4-neck flask, equipped with stirrer, gas inlet tube with frit, thermometer and reflux condenser and, after the addition of 0.5 g of tetrabutylammonium bromide as catalyst, heated with stirring to 100° C. At this temperature, a continuous stream of carbon dioxide gas (10 L, at standard temperature and pressure, per hour) is passed through the mixture during the reaction. The decrease in the epoxide groups as a function of time is followed by means of $^1$H-NMR spectroscopy. After 3 and 6 hours, 73% and 90% respectively of the epoxy groups had been converted into the corresponding cyclic carbonate units. After a total of 9 hours of reaction, epoxide groups could no longer be detected. After distillation cf the solvent, a light yellow, liquid reaction product is obtained, which has lateral 4-(propyloxymethyl)-1,3-dioxolan-2-one groups and, according to the results of analyses, corresponds to the expected average composition $MD_{36}D^{carbonate}_{12}M$ (Formula 3).

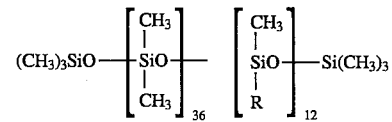

R = —H          Formula 1

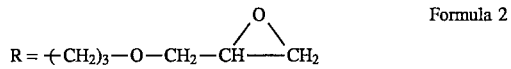

Formula 2

Formula 3

Example 2

As explained in Example 1, an epoxysiloxane of the general formula $MD_{15}D^{epoxide}_8M$ (Formula 4), having an average total chain length N=25, is synthesized by the platinum-catalyzed addition reaction between 3,4-epoxy-1-butene and an appropriate SiH siloxane. Subsequently (200 g, 0.86 moles) of this material are added to a 500 mL 4-neck flask, equipped with stirrer, gas inlet tube with frit, thermometer and reflux condenser and, after addition of 2 g of tetrabutylphosphonium chloride (70% in isopropanol) as catalyst, heated with stirring to 120° C. By passing a continuous stream of carbon dioxide (8 L, at standard pressure and temperature, per hour) through the reaction mixture, the epoxy siloxane is modified under these conditions within 3 hours to the corresponding liquid, yellow, carbonate-functional siloxane (Formula 5).

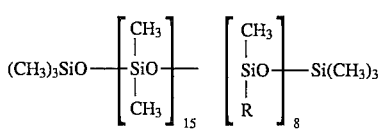

$R = -CH_2CH_2-CH\overset{O}{\underset{}{\diagdown}}CH_2$  Formula 4

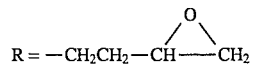

$R = -CH_2CH_2-CH\overset{\underset{}{\diagdown}}{\underset{|}{O}}\overset{}{\underset{|}{C}}\overset{}{\underset{}{\diagdown}}CH_2$  Formula 5

Example 3

A linear polymethylsiloxane (100 g, 0.2 moles), having terminal chlorodimethylsiloxy groups (Formula 6) and an average total chain length N=6, 60 g (0.4 moles) of glycidol (2,3-epoxy-1-propanol) and 40.4 g (0.4 moles) of triethylamine are reacted in a base-catalyzed condensation reaction at 50° C. with stirring to an SiOC-linked epoxy siloxane. After filtration of the precipitated triethylammonium hydrochloride, the reaction product is converted as described in Examples 1 and 2 into the corresponding carbonate-functional siloxane of average formula $M^{carbonate}D_4M^{carbonate}$ (Formula 7) by passing in gaseous carbon dioxide (22 L, at standard temperature and pressure/hour) in the presence of 0.5% by weight of hexadecyltrimethylammonium bromide at a temperature of 100° C.

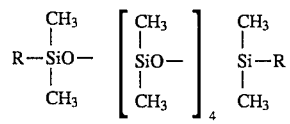

R = —Cl     Formula 6

     Formula 7

$R = -OCH_2-CH\overset{}{\underset{}{\diagdown}}CH_2$

Example 4

A material, having the average formula $MD^{epoxide}_{30}M$ (Formula 8) is obtained by the platinum-catalyzed addition reaction between allyl glycidyl ether and an SiH siloxane having poly(methyl-hydridosiloxy) groups. As described in Example 1, this material is converted with gaseous carbon dioxide (0.2 L, at standard temperature and pressure, per hour) in the presence of 2% by weight of benzyltriethyl ammonium chloride as catalyst in 7 hours at 130° C. to the corresponding carbonate-functional siloxane $MD^{carbonate}_{30}M$ (Formula 9).

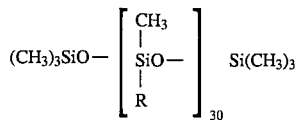

$R = +CH_2)_3-O-CH_2-CH\overset{O}{\underset{}{\diagdown}}CH_2$  Formula 8

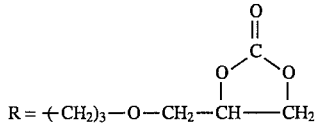

$R = +CH_2)_3-O-CH_2-CH\overset{\underset{}{\diagdown}}{\underset{|}{O}}\overset{}{\underset{|}{C}}\overset{}{\underset{}{\diagdown}}CH_2$  Formula 9

Example 5

An epoxy siloxane of Formula $M^{epoxide}D_4D^{epoxide}_4M$ (Formula 10), modified terminally and laterally, was obtained by the hydrosilylation reaction between a polyoxyethylene polymer having the average formula $CH_2=CH-CH_2-(O-C_2H_4-)_7OH$ and the appropriate SiH siloxane and the subsequent capping of the primary hydroxy end groups of the siloxane copolymer with epichlorohydrin. The epoxy groups were converted in the manner described in a subsequent reaction with addition of 2% by weight of lithium chloride as catalyst with gaseous carbon dioxide (0.2 L, at standard temperature and pressure, per hour) an 125° C. into the corresponding carbonate groups.

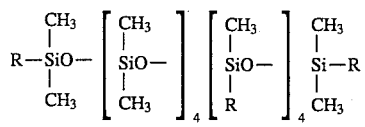

$R = +CH_2)_3-(OC_2H_4)_7-OCH_2-CH\overset{O}{\underset{}{\diagdown}}CH_2$  Formula 10

Testing the Applications

To check the application properties of the modified, carbonate-functional polydimethylsiloxanes, which are to be used pursuant to the invention, the product from Example 4 was mixed with various solvents in each case in a concentration of 1%. The results obtained are given in the Table below together with the results obtained using starting materials not of the invention.

| Solvent | $MD^{Epoxide}30M$ | $MD^{Carbonate}30M$ |
|---|---|---|
| Dichloromethane | 1 | 1 |
| Diethyl carbonate | 1 | 2 |
| Acetone | 2 | 1 |
| Tetrahydrofuran | 2 | 1 |
| Dimethyl sulfoxide | 1 | 1 |
| Dimethylformamide | 1 | 1 |
| Ethanol | 2 | 3 |
| Methanol | 1 | 2 |
| Water | 4 | 3 |

Key for above Table:
1 = soluble at room temperature
2 = soluble when hot
3 = partially soluble, swelling
4 = insoluble It is evident from the Table that the modified organopolysiloxanes, which are to be used pursuant to the invention, exhibit the desired application properties.

What is claimed is:

1. A method for the synthesis of polysiloxanes, containing cyclic carbonate groups and having a general, average formula

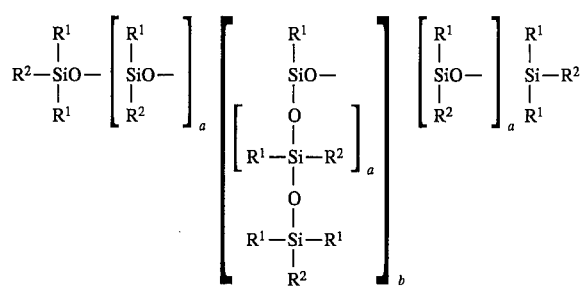

wherein
 R$^1$ are identical or different groups and represent alkyl groups with 1 to 4 carbon atoms or phenyl groups, at least 90% of the R$^1$ groups being methyl groups,
 R$^2$ has the same meaning as R$^1$, with the proviso that at least one R$^2$ group is a group of the general formula

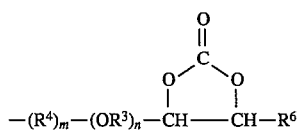

wherein
 R$^3$ are identical or different alkylene groups with 1 to 4 carbon atoms,
 R$^4$ is an optionally branched alkylene group with 1 to 20 carbon atoms and
 R$^6$ is hydrogen or an alkyl group with 1 to 4 carbon atoms or an alkylene group forming a ring with R$^4$ and
 m has a value of 0 or 1,
 n has a value of 0 to 20, with the proviso that either m or n is at least 1,
 a has a value of 0 to 1000,
 b has a value of 0 to 10, comprising the steps of reacting compounds of a general, average formula

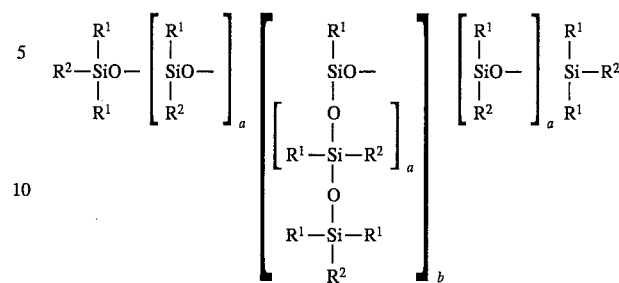

in which
 R$^5$ can be R$^1$, with the proviso that at least one R$^5$ group is a group of a general formula

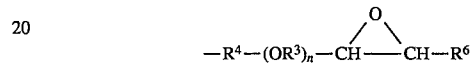

and the remaining groups and subscripts have the meaning given above, with carbon dioxide.

2. The method of claim 1, wherein a has a value of 5 to 200 and b a value of 0 to 2.

3. The method of claim 1 or 2, wherein b has a value of 0.

4. The method of claim 1 or 2, wherein the R$^1$ groups are methyl groups.

5. The method of claim 1, further comprising the step of carrying the reaction out catalytically at atmospheric pressure at a temperature of 0° to 180°.

6. The method of claim 5, wherein the reaction temperature is 70° to 150°.

* * * * *